(12) United States Patent
Min

(10) Patent No.: US 6,486,918 B1
(45) Date of Patent: Nov. 26, 2002

(54) METHOD FOR STORING VIDEO FRAME DATA IN A MEMORY

(75) Inventor: Cheol-Hong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/757,571

(22) Filed: Nov. 27, 1996

(30) Foreign Application Priority Data

Aug. 26, 1996  (KR) .............................................. 96/35543

(51) Int. Cl.[7] .................................................. H04N 7/24
(52) U.S. Cl. .............................. 348/425.1; 375/240.26; 348/718
(58) Field of Search ................................ ; 348/715–719, 348/390, 409, 410, 411, 412–421, 425.1; 375/240.26; H04N 5/907

(56) References Cited

U.S. PATENT DOCUMENTS

| 4,823,302 A | 4/1989 | Christopher |
| 4,847,809 A | 7/1989 | Suzuki |
| 5,561,465 A | 10/1996 | Fautier et al. |
| 5,710,604 A | * 1/1998 | Hodson et al. ............. 348/715 |
| 5,818,533 A | * 10/1998 | Auld et al. ................. 348/715 |

FOREIGN PATENT DOCUMENTS

| DE | 37 35 565 | 5/1989 | |
| EP | 0 618 722 | 10/1994 | |
| EP | 0 621 730 | 10/1994 | |
| EP | 0 696 874 | 2/1996 | |
| EP | 0 710 028 | 5/1996 | |
| EP | 0 714 208 | 5/1996 | |
| EP | 0 786 906 | 7/1997 | |
| GB | 2 182 817 | 5/1987 | |
| JP | 407184165 A | * 7/1995 | ............ H04N/7/24 |
| JP | 408130740 A | * 5/1996 | ............ H04N/7/34 |
| WO | 96/14710 | 5/1996 | |

* cited by examiner

*Primary Examiner*—David E. Harvey
(74) *Attorney, Agent, or Firm*—McKenna Long & Aldridge LLP

(57) ABSTRACT

A method for storing video frame data in a memory includes the steps of: sequentially receiving the video frame data; dividing the video frame data into a first part and a second part; storing the first part in the memory; storing the second part in the memory while the stored first part is read from the memory for a certain purpose; and reading the second part stored in the memory for the certain purpose.

10 Claims, 5 Drawing Sheets

METHOD FOR STORING VIDEO FRAME DATA IN A MEMORY

BACKGROUND OF THE INVENTION

1. Field of the Invention

The present invention relates to a method for storing video frame data in a memory of a video apparatus and, more particularly, to a video frame data storing method which can reduce the amount of memory required in a video apparatus.

2. Discussion of the Related Art

Generally, video frame data is composed and displayed on a screen in units of pixels. For effective transmission and storage of the video frame data, it is initially encoded. Since the video frame data contains an enormous amount of information, a video compression technique is used during encoding. The video compression technique is implemented by eliminating video information that is repeated between spatial and temporal domains or by coding the video information to a constant form. As one of the most widely known video compression techniques, there is the MPEG (Moving Picture Expert Group) specification.

The MPEG specification initially encodes the video frame data by a unit of a macro block and decodes the encoded video frame data by a unit of the macro block for the purpose of storage and display. Each macro block consists of 16×16 pixels, i.e., 16 scanning lines. The MPEG specification has recently been adopted for the high quality of an image in systems such as digital TV, direct broadcasting satellite (DBS), DVD, and high definition television (HDTV).

In an NTSC broadcasting system, one frame of data includes 480 scanning lines each having 720 pixels, as shown in FIG. 1a. A moving picture is achieved by displaying about 30 frames of data per second.

In a PAL broadcasting system, one frame of data consists of 576 scanning lines each having 720 pixels, as shown in FIG. 1b. The moving picture is formed by displaying about 25 frames of data per second.

Typically, one frame of video data is divided into an odd field (or a top field) and an even field (or a bottom field), and displayed on the screen in the order of the odd field and then the even field. In the following description, the odd and even fields may be referred to as first and second fields without distinguishing them. Moreover, one video frame of data is divided into an upper part and a lower part. In the NTSC system, the upper part and the lower part each have 240 scanning lines, respectively. Since the NTSC system uses an interlaced scanning method, one scanning line of the odd field and one scanning line of the even field are alternatively displayed on the screen, as indicated in FIG. 2. Therefore, in the frame data of the NTSC system, the upper part and the lower part, respectively, have 120 scanning lines of the odd field and 120 scanning lines of the even field.

FIG. 3a is a schematic block diagram showing a typical decoding part of a video apparatus, such as a television receiver and a video cassette recorder. A conventional method for storing the video frame data in a memory will now be described with reference to FIG. 3a.

A decoder 20 sequentially decodes encoded video frame data in response to a control signal $CS_1$ of a controller 10. A memory 30 sequentially stores the video frame data generated from the decoder 20 by a unit of the frame data in response to another control signal $CS_2$ of the controller 10 and then supplies the stored frame data to another storage device 50 or a display unit 40, for example, a television receiver or a monitor. That is, each video frame data is supplied to the display unit 40 or the storage device 50 after it is completely stored in the memory 20.

In more detail, each video frame of data consists of an odd field and an even field. As shown in FIG. 3b, the odd field data of the video frame data generated from the decoder 20 is stored in a first region 30a of the memory 30, and the even field data thereof is stored in a second region 30b of the memory 30, as shown in FIG. 3b. In this case, each field data is sequentially stored in each region by a unit of a constant number of scanning lines (8 or 16 scanning lines, for example). Thus, if one frame of data is divided into the odd field data and the even field data, and if these field data are stored in the first and second regions 30a and 30b, the memory 30 supplies the odd field data stored in the first region 30a to the storage device 50 or the display unit 40 in response to the control signal $CS_2$ of the controller 10 in a stored order of 1a, 2a, 3a , . . . (n−1)a, na. Thereafter, the memory 30 supplies the even field data stored in the second region 30b to the display unit 40 or the storage device 50 in a stored order of 1b, 2b, 3b , . . . (n−1)b, nb. The next video frame of data generated from the decoder 20 is then stored in the memory 30 in the same way as the above-described processes and then applied to the display unit 40 or the storage device 50.

It should be noted that each video frame of data is supplied to the display unit to be displayed or to another storage device to be stored after it is completely stored in the memory. Therefore, the memory 30 must have a capacity which is capable of storing a full frame of video data. However, there are disadvantages which will hereinafter be described. The memory is typically fabricated by a manufacturing company to a multiple of 2, that is, 1, 2, 4, or 8 megabytes (MB), etc. Hence, the maximum capacity of the video frame data to be stored does not accurately coincide with the capacity of commercially available memories. For example, in order to store the video frame data of the MPEG specification according to the PAL system, a memory capacity of a maximum of 1,866,240 bytes is needed. Further, in order to store each video bit stream before decoding, a memory capacity of 229,376 bytes is required. It is necessary to have an additional memory capacity of about 500,000 bytes in order to store on-screen display (OSD) data, audio data, and system data. Consequently, a memory capacity of about 2.6 MB is needed to store the video frame of data of the MPEG specification according to the PAL system during decoding.

However, as previously noted, since a memory having a memory capacity of 2.6 MB is not typically commercially fabricated, the next largest commercially available memory, which typically has a capacity of 4 MB, must be selected. Therefore, when designing the decoding part of the video apparatus, there occurs an unnecessary increase in manufacturing cost. Moreover, since the capacity of the video frame data for the PAL system is larger than that for the NTSC system, the video frame data for the PAL system cannot be stored in the memory corresponding to the NTSC system. In other words, the video apparatus of the PAL system is not compatible with that of the NTSC system.

SUMMARY OF THE INVENTION

Accordingly, the present invention is directed to a method for storing video frame data in a memory that substantially obviates one or more of the problems due to limitations and disadvantages of the related art.

An object of the present invention is to provide a method for storing video frame data in a memory which can reduce the capacity of a memory used in a decoding part of a video apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for storing video frame data in a memory includes the steps of: sequentially receiving the video frame data; dividing the video frame data into a first part and a second part; storing the first part in the memory; and storing the second part in the memory while the stored first part is read from the memory for a certain purpose; and reading the second part stored in the memory for the certain purpose.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the drawings. In the drawings.

DETAILED DESCRIPTION OF PREFERRED EMBODIMENTS

Figure 1A:
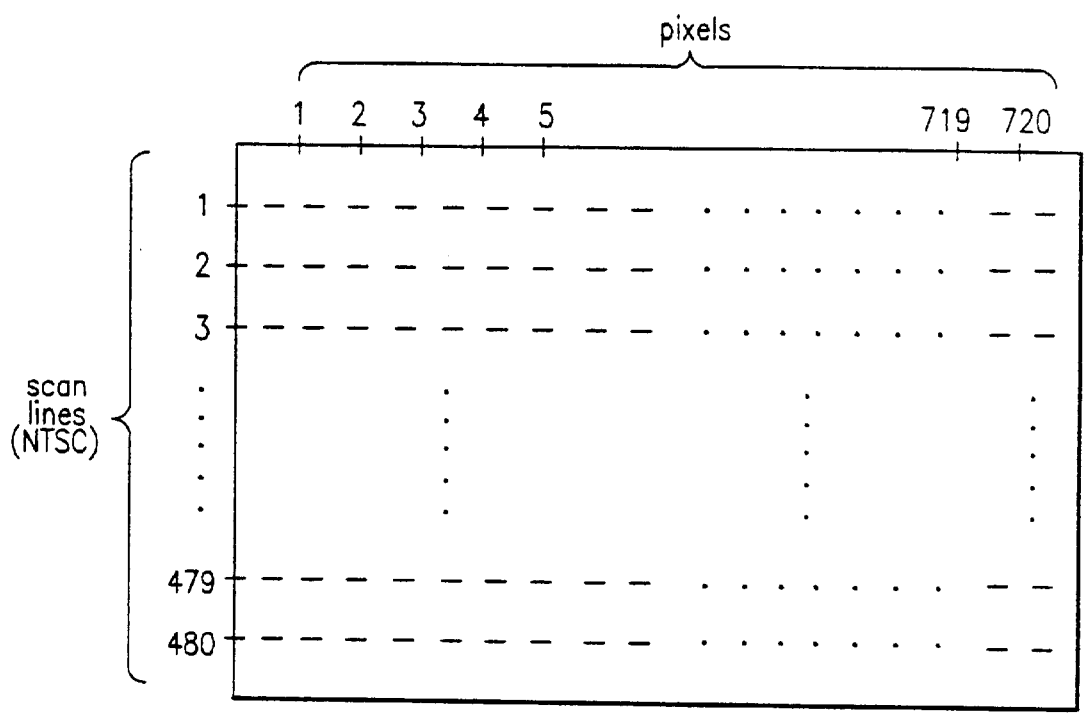
FIG. 1a is a diagram showing the construction of one screen of an NTSC broadcasting system.
Figure 1B:
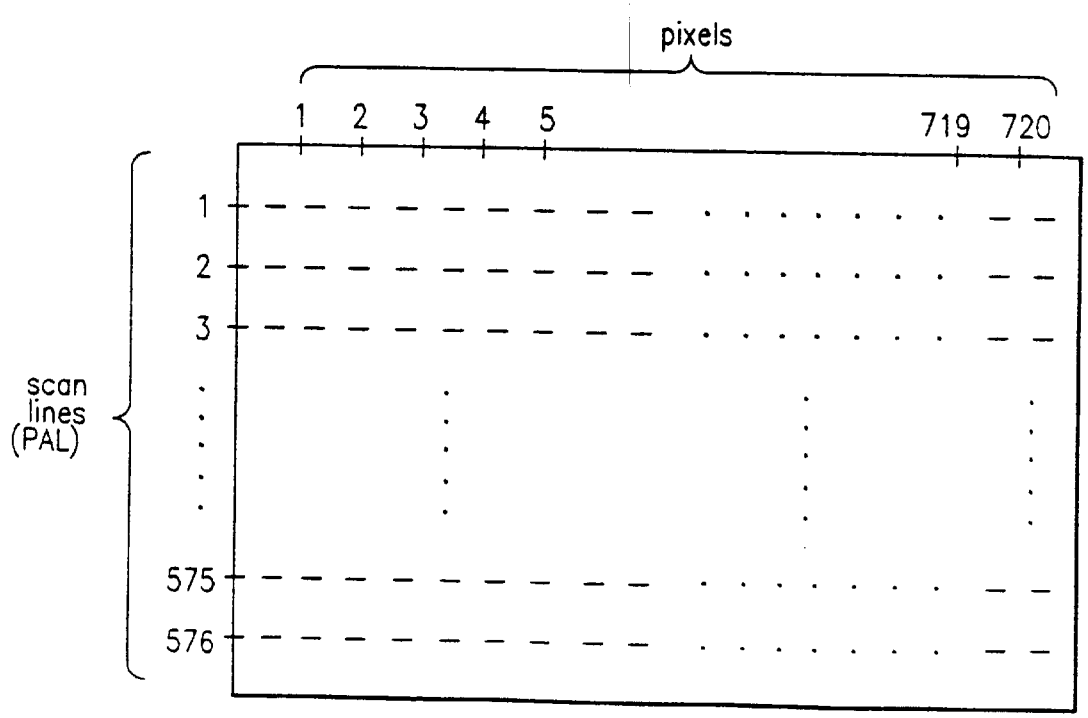
FIG. 1b is a diagram showing the construction of one screen of a PAL broadcasting system.
Figure 2:
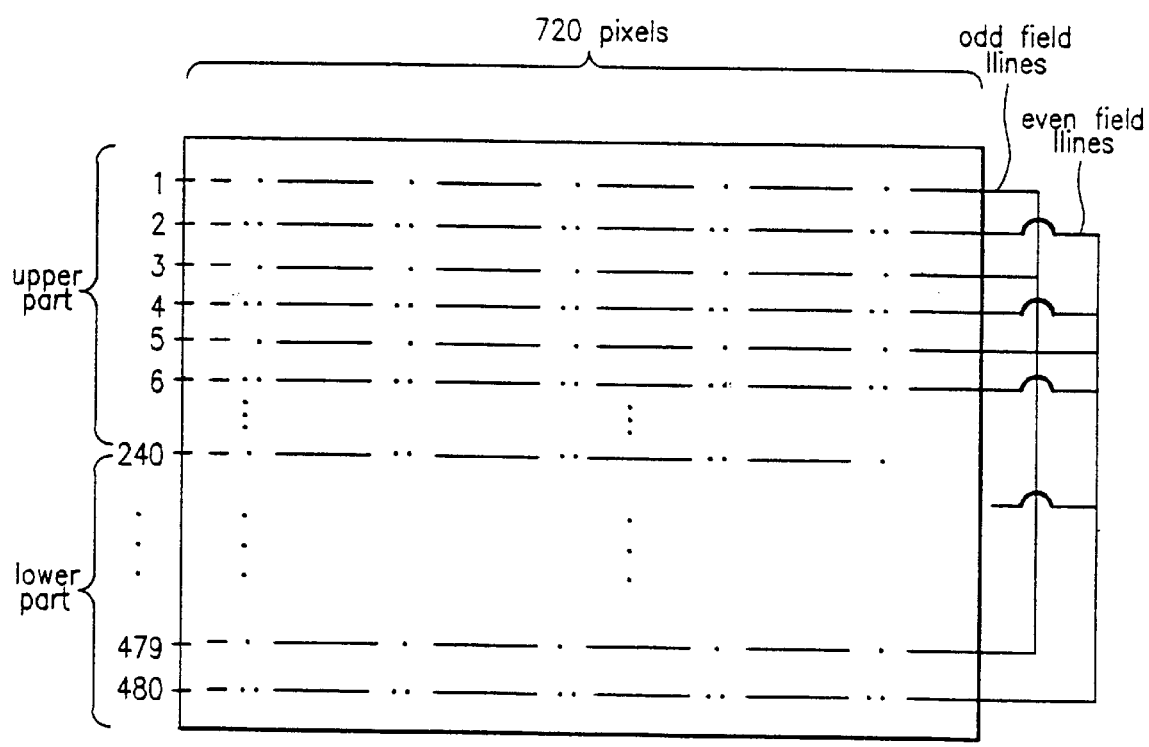
FIG. 2 is a diagram showing an interlaced scanning procedure.

Reference will now be made in detail to the preferred embodiments of the present invention, examples of which are illustrated in the accompanying drawings.

In accordance with the present invention, one video frame of data is divided into at least a few parts, and each part is stored in a memory. While reading each part from the memory, the next part is stored in the memory. That is, while the previously stored part is read from the memory, the next part is simultaneously stored in the memory so that the overall capacity of the memory can be reduced.

A decoding part of a video apparatus for storing the video frame data in memory in accordance with the present invention is the same as that of FIG. 3. Therefore, the description thereof is omitted and constituents of FIG. 3 are referred to instead.

The capacity of the memory can be reduced to a desired degree depending on how one video frame of data is divided and stored in the memory. To aid in understanding the basic concepts of the present invention, a first example for dividing the video frame data into two parts before its storage, and a second example for dividing the video frame data into n parts before its storage, will be described. In actuality, dividing the video frame data into n parts can be carried out by repeating or repetitively performing the procedure used in the case where the video frame data is divided into two parts.

According to the first example, a method for storing the video frame data in the memory includes the steps of sequentially receiving the video frame data, dividing each frame data into a first part and a second part, storing the first part in the memory, and storing the second part in the memory while the stored first part is being read from the memory for a certain purpose, and reading the second part stored in the memory for the same purpose.

The video frame data may be read from the memory 30 by the controller 10 to be displayed through the display unit 40, such as a television set, or may be read by the controller 10 to be stored in the storage device 50. In the above first example, the time required to read the first part of the frame data from the memory 30 is the same as that required to store the second part of the frame data in the memory 30. This is because the second part of the frame data is stored in the memory 30 while the first part is being read from the memory 30. Therefore, the memory 30 is a frame memory which can perform the function of storing one video frame of data, but which has a capacity only sufficient to store half the video frame data at a time. Further, the video frame data preferably consists of a plurality of interlaced scanning lines.

According to the second example, a method for storing the video frame data in the memory includes the steps of receiving the video frame data, dividing each frame data into n (n>2) parts, storing a first part in the memory, storing a second part in the memory while the stored first part is read from the memory for a certain purpose, storing other parts in the memory until an n-th part is stored in the memory while an (n−1)-th part is being read from the memory for the same purpose, and reading the stored n-th part for the same purpose.

In the second example, the memory may be a frame memory having a capacity which can store only 1/n of each video frame of data at a time. Each video frame data may be read from the memory by the controller 10 to be displayed or may be read to be stored in another storage device.

Hereinafter, various other embodiments of the present invention which can efficiently store one video frame of data in the memory, and thus can reduce the capacity of the memory, will now be described.

In the first embodiment of the present invention, a memory having a capacity which can store only 75% of a video frame of data at a time is used in the decoding part of the video apparatus.

Figure 3A:
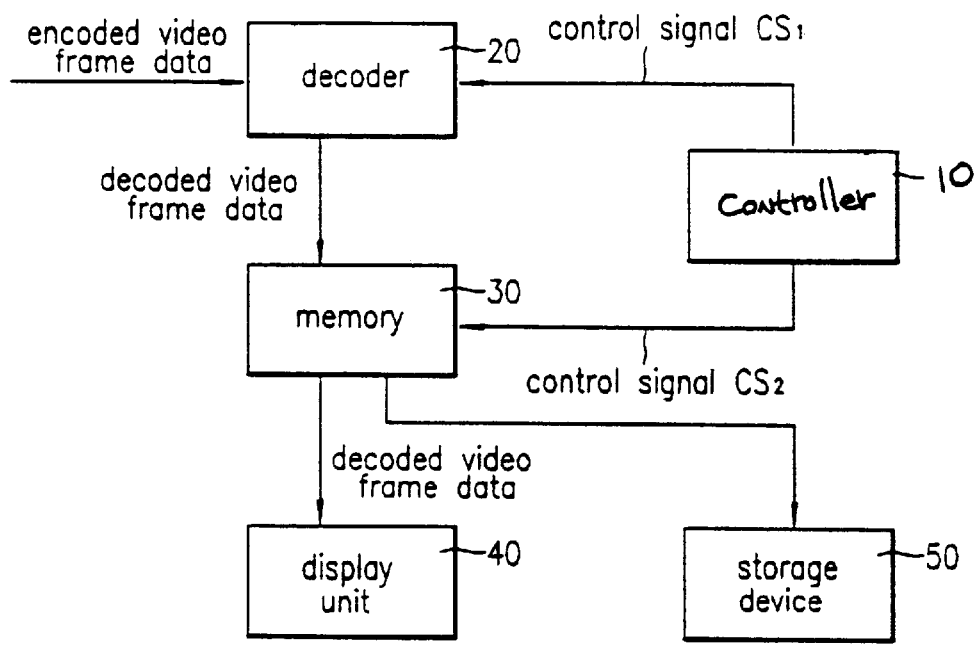
FIG. 3a is a block diagram showing a general decoding part of a video apparatus.
Figure 3B:
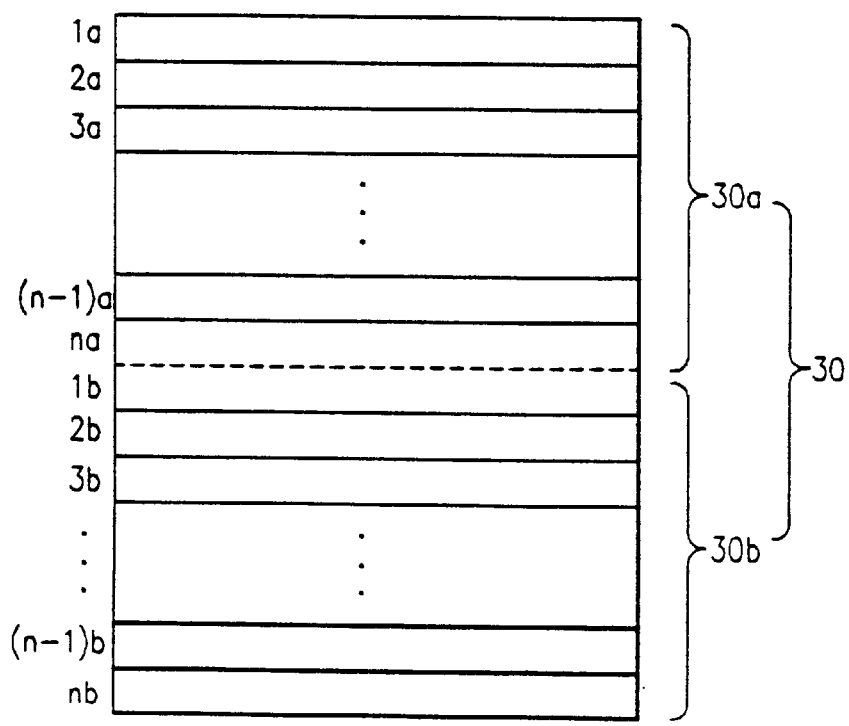
FIG. 3b is a diagram showing an example of how video frame data is stored in a frame memory according to the prior art.

In FIG. 3b, it is assumed that the video bit stream consists of upper and lower parts each having a first field (or a top field) and a second field (or a bottom field). The video bit stream is sequentially received through the decoder 20. The upper and lower parts of each video bit stream are sequentially decoded by the decoder 20.

Figure 4:
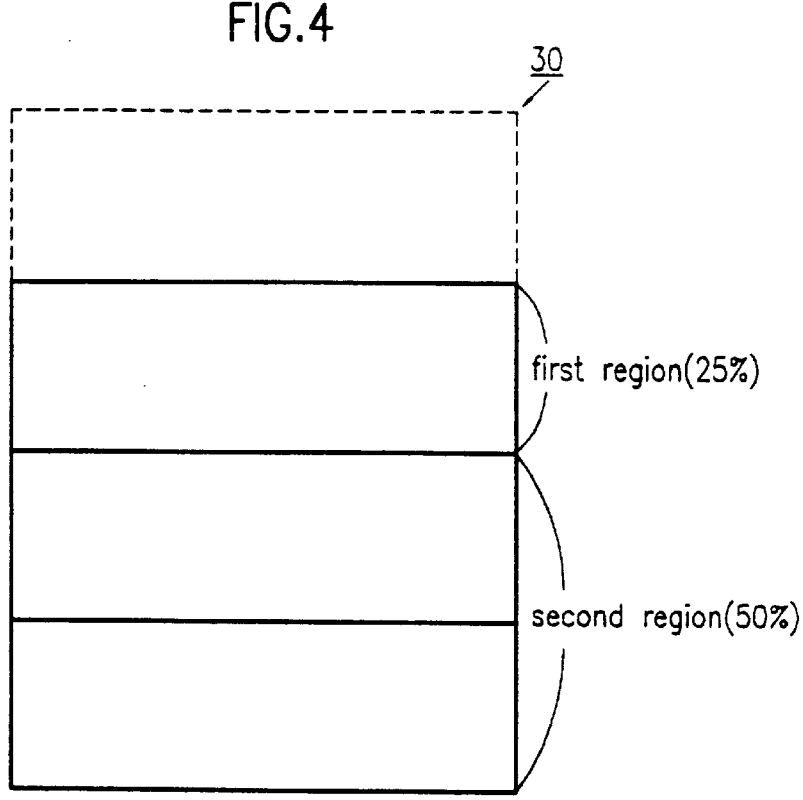
FIG. 4 is a diagram showing an example wherein a frame memory which can store only 75% of video frame data is used in a decoding part of a video apparatus according to a first embodiment of the present invention.

As shown in FIG. 4, the controller 10 stores the first field (or the top field) of the decoded upper part in a first region (25% of the total memory capacity) of the memory 30, and stores the second field (or the bottom field) of the decoded upper part in a first part (25% of the total memory capacity) of a second region of the memory 30. The first field of the upper part stored in the first region of the memory 30 is read to be displayed through the display unit 40 or to be stored in the storage device 50. While the first field of the upper part is generated, the first field of the lower part is stored in the first region of the memory 30 and the second field of the lower part is stored in a second part (25% of the total memory capacity) of the second region of the memory 30. Thereafter, the controller 10 sequentially reads the first field of the lower part stored in the first region of the memory 30, and the second field of the upper part and the second field of the lower part stored in the second region to be displayed through the display unit 40 or to be stored in the storage device 50.

As described above, and as shown in FIG. 4, the frame memory, which can store only 75% of the frame data corresponding to a single image, can be used in the decoding part of the video apparatus. More particularly, the first region of the frame memory 30 alternatively stores two top fields of one frame of data, and therefore has a capacity which can store 25% of one frame of data. The second region of the frame memory sequentially stores two bottom fields of one frame of data and has a capacity which can store 50% of one frame of data. That is, the present invention is very useful in storing the video frame data of the MPEG specification in a one frame memory having a small capacity. Therefore, it can be assumed that the video frame data is encoded by a unit of a macro block row, and thus the video frame data can be decoded by a unit of the macro block through the decoder 20. As is well known, the first and second fields are stored in the memory 30 and generated by a unit of a constant number of scanning lines. In the video frame data of the MPEG specification, since the video frame data is encoded and decoded by a unit of a macro block consisting of 16×16 pixels, the constant number can be easily adapted to one of 8 and 16.

The first and second fields stored in the frame memory 30 are read to be displayed through the display unit 40 or to be stored in the storage device 50. In the first embodiment of the present invention, although the first and second fields are defined as the top and bottom fields, respectively, they may be defined as the bottom and top fields, respectively. If so, the bottom field is stored in the memory 30 prior to the top field, and displayed through the display unit 40 or stored in the storage device 50. If a repeat field signal is supplied from the controller 10 or an external device (not shown), the memory 30 may generate the second field once more in response to the repeat field signal. If the first field is defined as the top field, the bottom field is generated once more, and if the first field is defined as the bottom field, the top field is generated once again.

If it is desired that the video data of the MPEG specification having 24 frame data per second is to be displayed to the NTSC system having 30 frame data per second, it is necessary to supply the repeat field signal to the memory 30 through the controller 10 in order to display an image decoded to 24 frame data per second to the NTSC system of 30 frame data per second. Then it is possible to display the 30 frame data per second. That is, if it is desired that the video signal of 24 frame data per second is to be displayed to the NTSC system of 30 frame data per second, the first and second fields of a single video frame of data stored in the memory 30 are displayed sequentially. If the repeat field signal is supplied to the memory 30 before the next video frame data is displayed, the second field of the video frame data is displayed once more, and then the first field of the next video frame data is displayed. Thereafter, the second field of the next video frame data is displayed. The first field may be any one of the top and bottom fields, and the second field is the other one thereof. Therefore, when the repeat field signal is supplied to the memory 30, the repeat field may be the top field or the bottom field.

In the first embodiment of the present invention, since one video bit stream is divided into upper and lower parts each consisting of first and second fields, one video bit stream has 4 fields. However, if the repeat field signal is supplied, and thus the 4 fields increase to 5 fields, the video data of the MPEG specification having 24 frame data per second can be displayed to 30 video frame data per second which, as discussed, is suitable for the NTSC system.

According to the present invention, the video frame data (in particular, B data among intra-coded picture (I) data, predictive-coded (P) data, and bidirectionally predictive-coded (B) data) of the MPEG specification can be decoded and displayed irrespective of the NTSC and PAL systems. Generally, the capacity of the frame memory for storing the video frame data of the NTSC system is about 20% less than that for storing the video frame data of the PAL system.

In the case where the decoder 20 shown in FIG. 3a processes the video frame data of the PAL system while processing the video frame data of the NTSC system, since the capacity of the frame memory within a television receiver of the NTSC system is only 83% of the capacity of the video frame data of the PAL system, the capacity of the memory is absolutely insufficient. In order to make a compatible decoding part which is available and usable in both the PAL and NTSC systems, the capacity of the frame memory should be adjusted to that of the PAL system.

In this case, there is required a frame memory having a capacity of 4 MB, which is greater than the memory capacity (2 MB) of the NTSC system. This problem is solved by the above-mentioned memory storing method. That is, the video frame data of the NTSC system is stored in the frame memory of 2 MB which can store 100% of the video frame data and for display on the screen. In the case where the decoder 20 receives and displays the video data of the MPEG specification of the PAL system, the frame memory of 2 MB used in the NTSC system can store only about 83% of the video frame data of the PAL system. However, if the above-described storing method is applied, it is possible to decode and display the video frame data of the NTSC and PAL systems by use of the frame memory of only 2 MB without adding another additional frame memory.

Figure 5:
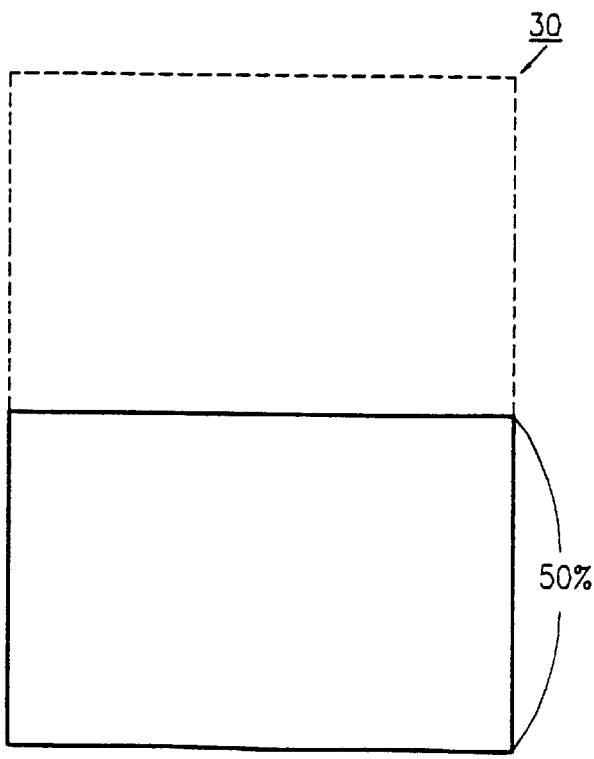
FIG. 5 is a diagram showing another example wherein a frame memory which can store only 50% of video frame data is used in a decoding part according to a second embodiment of the present invention.

A second embodiment of the present invention will now be described with reference to FIGS. 3 and 5, for example. In the second embodiment of the present invention, a memory having a capacity which can store only 50% of the video frame data at a time is used in the decoding part of the video apparatus. In this case, it is assumed that the video bit stream consists of first and second fields without being divided into upper and lower parts.

The decoder 20 sequentially receives video frame data consisting of the first and second fields. The decoder 20 decodes each frame data and stores only the first field among the decoded frame data in the frame memory 30, as shown in FIG. 5. The stored first field is read from the frame memory 30 by the control of the controller 10. While the first field is being read, the decoder 20 again decodes the received video frame data by the controller 10 and stores only the second field among the again-decoded frame data in the frame memory 30 by the controller 10. Finally, the stored second field is read from the memory 30.

As described in the first embodiment of the present invention, the first field may be any one of the top and bottom fields, while the second field may be the other one thereof. The second embodiment differs from the first embodiment in that the second embodiment requires the decoding to occur twice. In order to display the video data of the MPEG specification having 24 frame data per second to the NTSC system having 30 frame data per second, the repeat field signal may be supplied to the frame memory 30 through the controller 10. The second field is read from the frame memory 30 once more in response to the repeat field signal. The further read second field may be the top field or the bottom field. The second embodiment can be used in both the video frame data of an interlaced system and the video frame data of a non-interlaced system, but it is not as useful in the non-interlaced system since the decoding is unnecessarily performed twice.

The decoded first and second fields are read from the frame memory 30 to be displayed on the display unit 40, such as a television set or a monitor, or to be stored in the storage device 50. In the second embodiment, since the decoding is performed twice and the frame memory 30 stores only one field data during each decoding, the frame memory 30 has a capacity which can store only 50% of the video frame data. Therefore, the capacity of the frame memory used in the decoding part of the video apparatus can be reduced and can store the video frame data of other broadcasting systems having a larger amount of data through use of the 2 MB frame memory of the NTSC system.

As described above, the present invention can be applied to the video data of the MPEG specification. In such a case, the video frame data is encoded in a macro block unit. The first and second fields are stored and generated by a unit of a constant number of scanning lines. The constant number of scanning lines may be 8 or 16 scanning lines since the video frame data of the MPEG specification is encoded and decoded by a unit of the macro block corresponding to 16 scanning lines of 16×16 pixels. The advantages of the second embodiment are essentially the same as those of the first embodiment, and therefore no further description of such advantages will be given.

Figure 6:
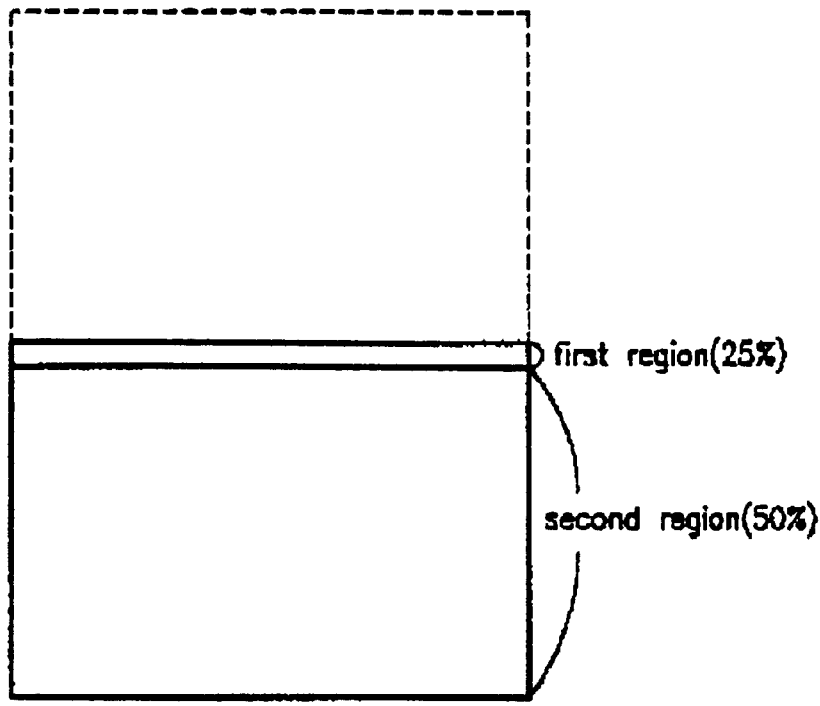
FIG. 6 is a diagram showing still another example wherein a frame memory which can store only 52.5% of video frame data is used in a decoding part according to a third embodiment of the present invention.

A third embodiment of the present invention will now be described with reference to FIGS. 3 and 6. In the third embodiment, the memory having a capacity which can store only 52.5% of the video frame data is used in the decoding part of the video apparatus.

The decoder 20 receives the video bit stream, i.e., the video frame data, consisting of the first and second fields. The first and second fields are respectively divided into n parts, and the first and second fields divided into n parts are decoded. The first to the n-th parts of the decoded first field are sequentially stored in a first region (2.5%) of the frame memory 30 indicated in FIG. 6 and generated for a certain purpose. The first to the n-th parts of the decoded second fields are sequentially stored in a second region (50%) of the frame memory 30. Finally, each part of the second field stored in the second region of the frame memory 30 is read in stored order.

The first field may be any one of the top and bottom fields and the second field may be the other one thereof. The video frame data according to the third embodiment of the present invention may be used in both the interlaced system and the non-interlaced system. The decoded first and second fields are generated to be displayed through the display unit 40 or to be stored in the storage device 50. The frame memory 30 can store each decoded video frame data with the capacity which can store only 52.5% of one video frame of data at a time. The first and second regions of the frame memory 30 respectively occupy 2.5% and 50% out of the 52.5% shown in FIG. 6. In the video frame data of the MPEG specification, since the video frame data is encoded and decoded by a unit of a macro block corresponding to 16 scanning lines, each 1/n of the first and second fields is equivalent to 8 scanning lines. After the first field divided into the n parts is read from the frame memory 30, the second field stored in the frame memory 30 is read in stored order by a unit of a constant number of scanning lines.

More particularly, the decoder 20 decodes the first part of the first field and the first part of the second field. The controller 10 stores the decoded first part of the first field in the first region (2.5%) of the fame memory 30 and stores the decoded first part of the second field in the second region (50%) of the memory frame 30. Thereafter, the controller 10 reads the first part of the first field stored in the first region of the frame memory 30, and decodes the second part of the first field and the second part of the second field while the first part of the first field is read. The controller 10 stores the decoded second part of the first field in the first region of the frame memory 30 and stores the decoded second part of the second field in the second region. The controller 10 repeats the decoding, storing, and reading processes for the other parts until the n-th part of the first field is read and the n-th part of the second field is stored in the second region of the frame memory 30. Finally, the first to the n-th parts of the second field stored in the second region of the frame memory 30 are sequentially read in stored order. The second field can be read once more by supplying the repeat field signal to the frame memory 30 through the controller 10.

Hereinafter, an example applied to B video data among the video frame data of the MPEG specification encoded by a unit of a macro block will be described.

The B video data may be contained in the NTSC system and may be contained in the PAL system. The B video data is one of 3 types of video data of the MPEG specification, that is, I (intra-coded picture) data, P (predictive-coded) data, and B (bidirectionally predictive-coded) data. If the decoder 20 decodes the video frame data, the controller 10 divides the decoded first and second fields into a unit of 8 scanning lines to be respectively stored in the first region (2.5%) and the second region (50%) of the frame memory 30. The decoded data of the B video data consists of a unit of a macro block (16 scanning lines) and the 16 scanning lines consist of the first field of 8 scanning lines stored in the first region of the frame memory 30 and the second field of 8 scanning lines stored in the second region of the frame memory 30. The first region (2.5%) of the frame memory 30 has a capacity which can store the 16 scanning lines and the controller 10 stores the first field of the decoded 8 scanning lines in the first region. Thereafter, the controller 10 stores the decoded 8 scanning lines corresponding to the second field of the B video data in the second region (50%) of the frame memory 30.

The decoder 20 decodes the 16 scanning lines of a unit of the macro block row. The controller 10 stores the 8 scanning lines corresponding to the first field in an empty part of the first region (2.5%) of the frame memory 30 and stores the 8 scanning lines corresponding to the second field in the second region (50%) of the frame memory 30. At the same time, the 8 scanning lines of the first field stored in the first region are displayed. In the second region (50%) of the frame memory 30, the second field of the 16 scanning lines has been stored. Each time the 8 scanning lines are displayed, the macro block corresponding to the 16 scanning lines, that is, the first field of the 8 scanning lines and the second field of the 8 scanning lines, are stored in the frame memory 30. Therefore, the decoding speed is twice the displaying speed. The advantages of the third embodiment are the same as those of the first and second embodiments.

A fourth embodiment of the present invention will now be described with reference to FIGS. 3 and 7, for example. In the fourth embodiment, a memory having a capacity which can store only 2.5% of the video frame data is used in the decoding part of the video apparatus.

The decoder 20 receives the video frame data consisting of the first and second fields. The decoder 20 respectively divides the first and second fields into n parts, and decodes the first and second fields divided into the n parts. The controller 10 stores the decoded first field from the first part to the n-th part in the frame memory 30 and reads the stored first field for one purpose. The decoded second field is discarded. The decoder 20 decodes the first and second fields divided into the n parts once more. The first to the n-th parts of the decoded second field are sequentially stored in the frame memory 30 and read for the same purpose. The decoded first field is discarded. As noted above, the first and second fields are sequentially displayed by decoding one video frame data twice. The decoding speed of the decoder 20 should preferably be faster than twice the display speed of the display unit 40.

More specifically, assuming the video frame data is the B video data of the MPEG specification, the decoder 20 sequentially decodes the upper and lower parts of the video bit stream (the B video data of the MPEG specification) by a unit of a macro block. The first field of 8 scanning lines of the decoded upper part is stored in a first region (2.5%/2) of the frame memory 30. The first field of the 8 scanning lines of the decoded lower part is stored in a second region (2.5%/2), and the first field of the upper part of the 8 scanning lines previously stored in the first region is displayed. That is, while displaying the 8 scanning lines of the first field of the upper part, the macro block (16 scanning lines) of the lower part is decoded.

Only the first field of the lower part is stored in an empty part of the frame memory 30 and the second field of the lower part is discarded. If the first field of the decoded 8 scanning lines is again stored in the first region, the first field of the 8 scanning lines stored in the second region is displayed by the controller 10.

The 8 scanning lines corresponding to the first field of the upper part are displayed after the 16 scanning lines corresponding to the macro block of the lower part are decoded. In such a manner, the first field is alternatively stored in the first and second regions of the frame memory 30 by a unit of the 8 scanning lines and displayed through the display unit 40. The decoding is performed once more during the next field time. Only the second field of the B video data is alternatively stored in the first and second regions of the frame memory 30 and displayed through the display unit 40 by the controller 10. In this case, the data of the decoded first field is discarded.

Thus, one video frame data is decoded twice and a corresponding image is displayed. In the above description, the decoded first and second fields are read from the frame memory 30 to be displayed. However, the first and second fields may be read to be stored in another storage device.

Figure 7:
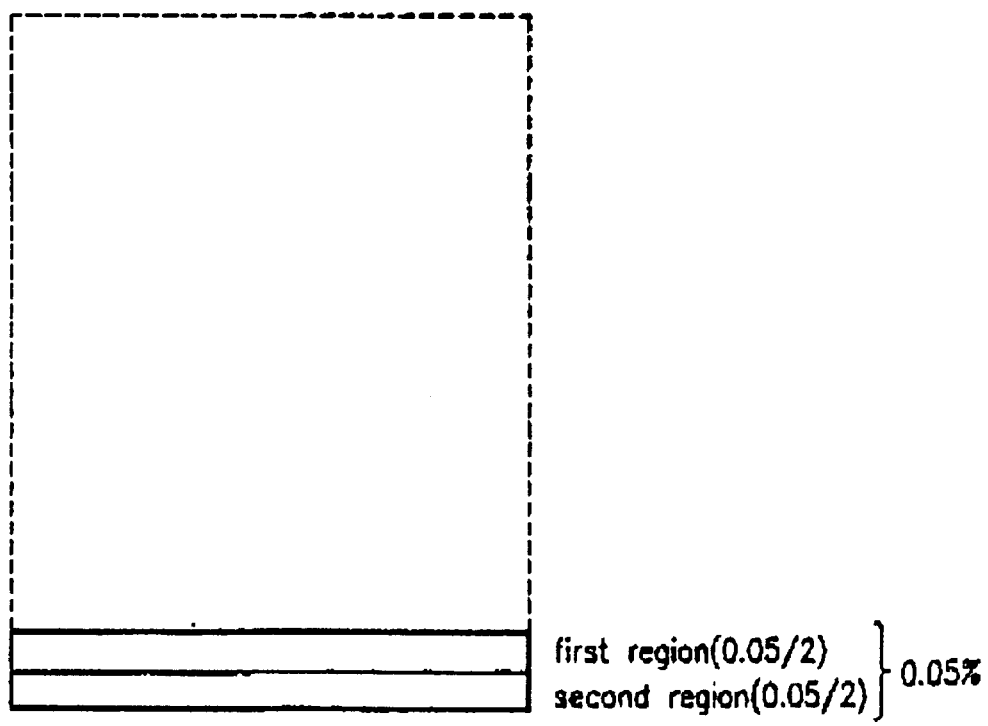
FIG. 7 is a diagram showing still yet another example wherein a frame memory which can store only 0.025% of video frame data is used in a decoding part according to a fourth embodiment of the present invention.

As shown in FIG. 7, the frame memory 30 has a capacity which can store only 2.5% of one frame of data. The frame memory 30 may have a capacity corresponding to 1/n of one frame of data. Assuming that the video frame data has the MPEG specification, the frame data is encoded by a unit of a macro block. Therefore, the decoder should implement the decoding by a unit of a macro block. The above 1/n of the first and second fields corresponds to 8 scanning lines. The decoding speed should therefore preferably be faster than twice the display speed. Consequently, the decoder 20 decodes the first part of each field and stores only the first part of a corresponding field in the first region of the frame memory 30. Each second part of the first and second fields is decoded and the decoded second part of the corresponding field is stored in the second region of the frame memory 30. While the first part stored in the first region is displayed through the display unit 40, the third part of each field is decoded and the third part of the corresponding field is stored in the first region. While the second part of the second region is displayed, the fourth part is decoded and stored in the second region. Other parts repeat the above processes until the n-th part of the corresponding field is read from the frame memory 30. If the repeat field signal is supplied to the frame memory 30 by the controller 10, the video data of the MPEG specification having 24 frame data per second can be displayed to the NTSC system having 30 frame data per second.

As may be apparent from the aforementioned description, the capacity of the frame memory can be reduced by activating the utility of the frame memory. Furthermore, it is possible to decode the video frame data of the PAL system by use of the decoding device of the video frame data of the NTSC system. Therefore, an NTSC-only digital television receiver and a PAL-only digital television receiver can be simultaneously supported by one chip.

It will be apparent to those skilled in the art that various modifications and variations can be made in the method for storing video frame data in a memory of the present invention without departing from the spirit or scope of the invention. Thus, it is intended that the present invention cover the modifications and variations of this invention provided they come within the scope of the appended claims and their equivalents.

What is claimed is:

1. A method for storing video frame data in a memory, the method comprising the steps of:

sequentially receiving the frame data, the frame data comprising upper and lower parts each including first and second fields;

decoding both the upper and lower parts of the received frame data;

storing the first and second fields of the decoded upper part in first and second regions of the memory, respectively;

reading the first field of the upper part stored in the first region of the memory for a certain purpose, storing the first field of the lower part in the first region while the first field of the upper part is being read, and storing the second field of the lower part in the second region of the memory; and sequentially reading the first field of the lower part stored in the first region, the second field of the upper part stored in the second region, and the second field of the lower part stored in the second region.

2. A method for storing video frame data in a memory as set forth in claim 1, wherein the memory is a frame memory which can store only 75% of one frame of data corresponding to one image at a time.

3. A method for storing video frame data in a memory as set forth in claim 2, wherein the first region of the frame memory has a capacity which can store 25% of one frame of data at a time and wherein the second region of the frame memory has a capacity which can store 50% of one frame of data at a time.

4. A method for storing video frame data in a memory as set forth in claim 1, wherein the frame data is encoded by a unit of a macro block suitable for an MPEG (Moving Picture Expert Group) specification and decoded by a unit of the macro block.

5. A method for storing video frame data in a memory as set forth in claim 1, wherein the first and second fields are stored and read by a unit of a constant number of scanning lines.

6. A method for storing video frame data in a memory as set forth in claim 5, wherein the constant number of scanning lines is one of 8 scanning lines and 16 scanning lines.

7. A method for storing video frame data in a memory as set forth in claim 1, wherein the first and second fields stored in the memory are read for display by a display device.

8. A method for storing video frame data in a memory as set forth in claim 1, wherein the first and second fields stored in the memory are read for storage in a storage device.

9. A method for storing video frame data in a memory as set forth in claim 1, further comprising the step of reading the second field an additional time in response to an externally applied repeat field signal.

10. A method for storing video frame data in a memory as set forth in claim 1, wherein the video frame data is B video data of the MPEG (Moving Picture Expert Group) specification.

* * * * *